United States Patent
Yoshida et al.

[11] Patent Number: 5,885,724
[45] Date of Patent: Mar. 23, 1999

[54] MAGNETIC RECORDING MEDIUM

[75] Inventors: Osamu Yoshida; Katsumi Endo; Noriyuki Kitaori; Katsumi Sasaki; Junko Ishikawa, all of Tochigi, Japan

[73] Assignee: Kao Corporation, Tokyo, Japan

[21] Appl. No.: 696,790

[22] Filed: Aug. 14, 1996

[30] Foreign Application Priority Data

Aug. 25, 1995 [JP] Japan ................................. 7-217598

[51] Int. Cl.$^6$ ........................................................ G11B 5/66
[52] U.S. Cl. .................. 428/694 T; 428/694 TS; 428/694 TP; 428/694 TC; 428/694 TR; 428/694 TF; 428/900
[58] Field of Search .................. 428/694 T, 694 TS, 428/694 TP, 694 TC, 694 TR, 694 TF, 900

[56] References Cited

U.S. PATENT DOCUMENTS 5,538,802  7/1996  Kitaori ................. 428/694 T

FOREIGN PATENT DOCUMENTS 61-54023  3/1986  Japan.
6-112043  4/1994  Japan.

*Primary Examiner*—Leszek Kiliman
*Attorney, Agent, or Firm*—Oblon, Spivak, McClelland, Maier & Neustadt, P.C.

[57] ABSTRACT

The present invention is a magnetic recording medium comprising a substrate and a magnetic layer, wherein said magnetic layer is coated on said substrate, said magnetic layer is an Fe—N—O magnetic layer, each of Fe content $F_1$, N content $N_1$ and O content $O_1$ contained in said Fe—N—O magnetic layer satisfies respective requirements $F_1$=50–80 at. %, $N_1$=9–25 at. %, $O_1$=11–36 at. % and $N_1<O_1$, and said magnetic layer exhibits a coercive force Hc in a horizontal direction ranging from 1200 to 2400 Oe. This magnetic recording medium exhibits excelleny C/N.

17 Claims, 4 Drawing Sheets

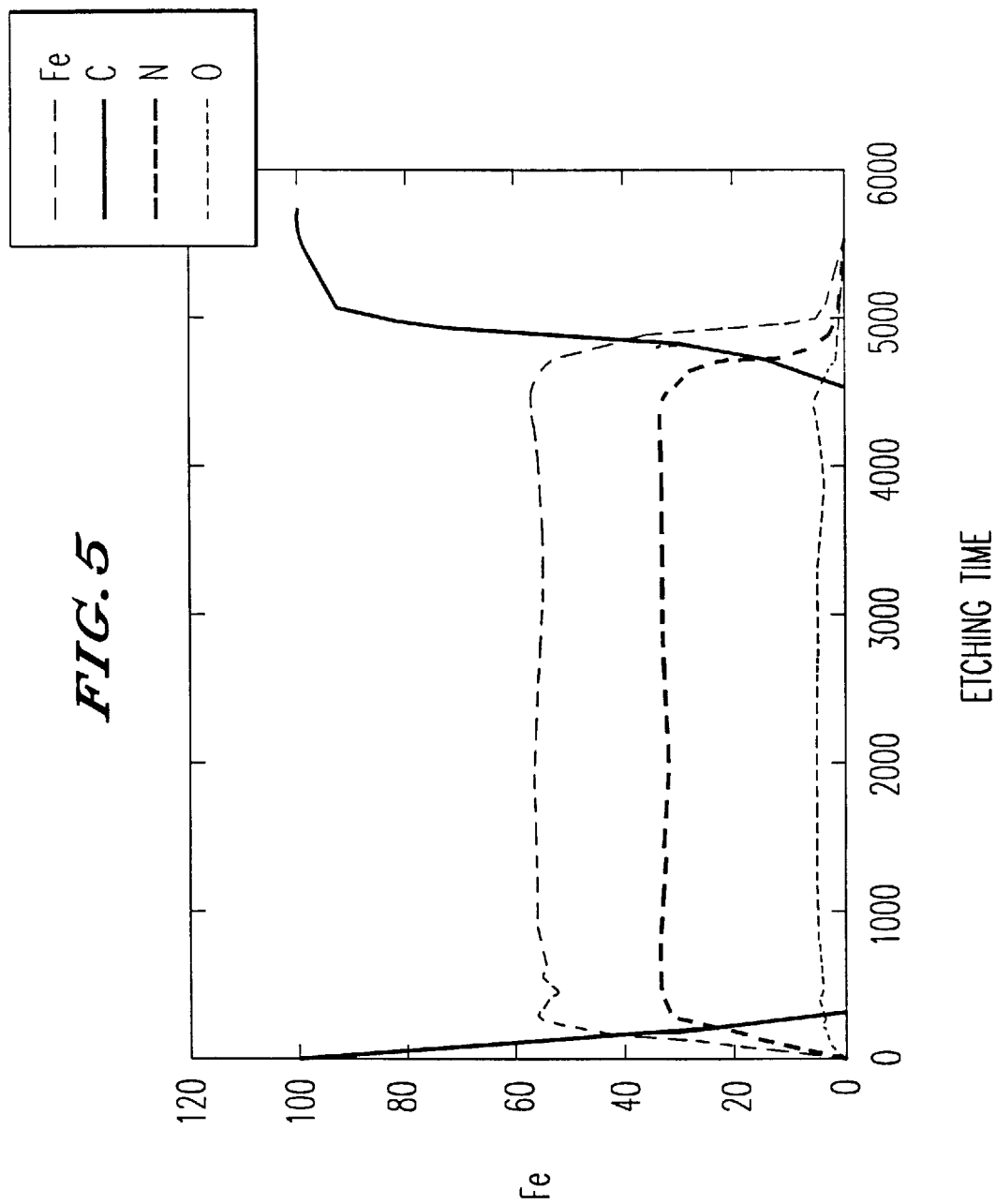

MAGNETIC RECORDING MEDIUM

BACKGROUND OF THE PRESENT INVENTION

The present invention relates to a magnetic recording medium provided with an Fe—N—O metallic magnetic layer.

A magnetic recording medium of a metallic thin film type, which is prepared by depositing or spattering, has been well known. The magnetic layer is produced by using a magnetic alloy sourced from, for example, Co—Ni, Co—Cr or the like.

However those metals Co, Ni, Cr or the like are expensive. Then inexpensive metal such as Fe has been expected for the application.

A JP-A-54023/1986 discloses a magnetic recording medium provided with a magnetic layer formed of $Fe_{1-x-y}N_xO_y$ ($0.25 \leq X+Y < 0.60$, $X>Y$). The obtained magnetic recording medium has excellent magnetic property, weather resistance and durability but fails to provide a high regeneration output nor good S/N.

Another JP-A-112043/1994 discloses a magnetic recording medium provided with an Fe—N—O magnetic layer formed of Fe (70–90 at. %), N (5–15 at. %) and O (5–15 at. %). For example, the magnetic recording medium provided with the Fe—N—O magnetic layer formed of 80 at. % of Fe, 5 at. % of N and 15 at. % of O is disclosed. The obtained magnetic recording medium, however, has been found not to provide a high regeneration output.

SUMMARY OF THE INVENTION

A first object of the present invention is to provide a magnetic recording medium for supplying a high regeneration output over a wide range from a low frequency to a high frequency.

A second object of the present invention is to provide a magnetic recording medium exhibiting an excellent C/N.

The present invention is realized by a magnetic recording medium comprising a substrate and a magnetic layer deposited thereon. The magnetic layer is an Fe—N—O magnetic layer. Each of Fe content $F_1$, N content $N_1$ and O content $O_1$ contained in the Fe—N—O magnetic layer satisfies respective requirements (1), (2), (3) and (4). The magnetic layer exhibits a coercive force Hc in a horizontal direction ranging from 1200 to 2400 Oe.

$F_1$=50–80 at. % (1)

$N_1$=9–25 at. % (2)

$O_1$=11–36 at. % (3)

$N_1<O_1$ (4)

It is preferable that each of the F1, N1 and O1 satisfies respective requirements (1), (2), (3) and (4a).

$F_1$=50–80 at. % (1)

$N_1$=9–25 at. % (2)

$O_1$=11–36 at. % (3)

$1.25 \times N_1 \leq O_1$ (4a)

It is preferable that the Fe—N—O magnetic layer satisfies a requirement of N content<O content over a whole area in a vertical direction to the magnetic layer.

Each content, $F_1$, $N_1$ and $O_1$ is defined to satisfy the above respective equations on the ground that the condition of $N1>O_1$ resulted in increased noise level and deteriorated C/N.

When $F_1$, $N_1$ and $O_1$ satisfy the above equations and the Hc value is set to be ranged from 1200 to 2400 Oe, a high output and excellent C/N can be obtained over a wide range from a low frequency to a high frequency.

The Fe—N—O magnetic layer preferably has a coercive force Hc in a horizontal direction ranging from 1500 to 2000 Oe.

It is preferable that the magnetic recording medium has a protective film coated on the magnetic layer.

It is preferable that the magnetic recording medium has a lubricant film coated on the magnetic layer.

It is specifically preferable that the magnetic recording medium has the protective film coated on the magnetic layer and the lubricant film coated on the protective film.

Preferably the protective film is a carbon film, specifically, a diamond-like carbon film.

Preferably the lubricant is a fluorine lubricant.

BRIEF DESCRIPTION OF THE DRAWINGS

FIG. 3 to FIG. 5 represent Auger profiles of the respective magnetic films.

DETAILED DESCRIPTION OF THE INVENTION

Figure 1:
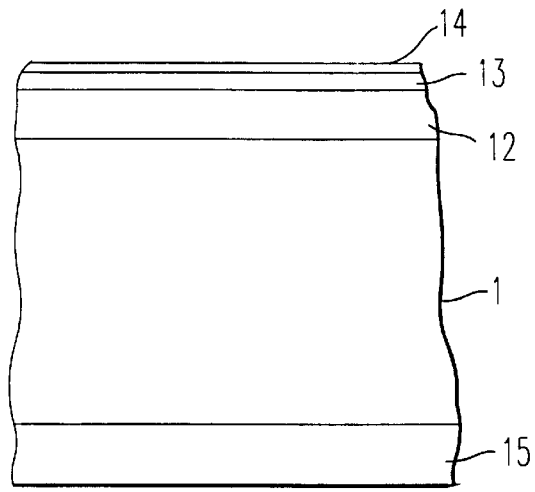
FIG. 1 is a sectional view of a magnetic recording medium of the present invention.

Referring to FIG. 1, a magnetic recording medium (magnetic tape) A of the present invention comprises a substrate 1 and a magnetic layer 12. More specifically the magnetic tape A comprises the substrate 1, magnetic layer 12, a protective film 13 and a lubricant film 14. The magnetic layer 12 is coated on the substrate 1. A thickness of the magnetic layer 12 is approximately 500 to 5000 Å. The protective film 13 is coated on the magnetic layer 12. A thickness of the protective film 13 is approximately 50 to 200 Å. The lubricant film 14 is coated on the protective film 13. A thickness of the lubricant film 14 is approximately 20 to 70 Å.

The magnetic layer 12 is an Fe—N—O magnetic layer. Each of Fe content $F_1$, N content $N_1$ and 0 content $O_1$ satisfies the following requirements (1), (2), (3), (4) and more preferably, (1), (2), (3) and (4a).

$F_1$=50–80 at. % (1)

$N_1$=9–25 at. % (2)

$O_1$=11–36 at. % (3)

$N_1<O_1$ (4)

$F_1$=50–80 at. % (1)

$N_1$=9–25 at. % (2)

$O_1$=11–36 at. % (3)

$1.25 \times N_1 < O_1$ (4a)

The magnetic layer 12 satisfies the requirement of N content<O content over a whole area in a vertical direction thereto.

A coercive force Hc of the magnetic layer 12 in a horizontal direction ranges from 1200 to 2400 Oe, more specifically, from 1500 to 2000 Oe.

The magnetic tape A of the present invention can be prepared through a PVD (physical vapor deposition) method such as deposition, spattering or the like.

Figure 2:
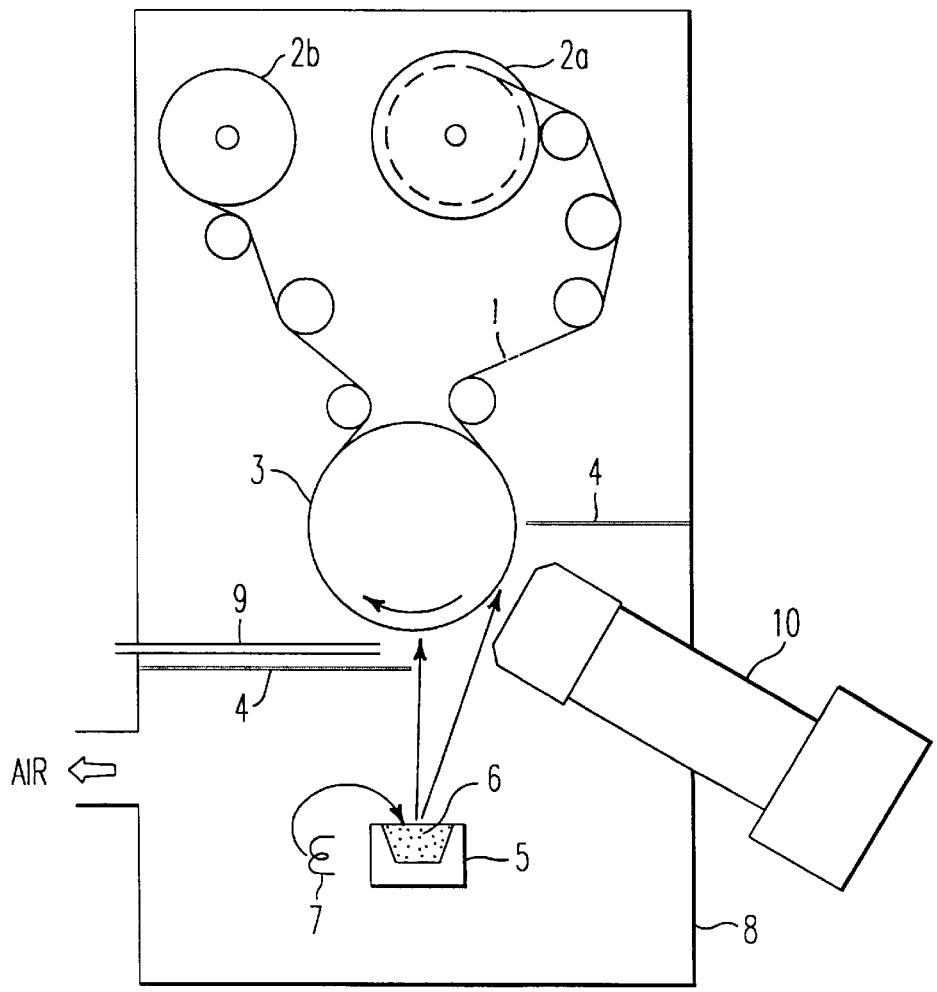
FIG. 2 is a schematic view of a device for producing a magnetic recording medium of the present invention.

For example, FIG. 2 shows the magnetic tape production through an ion assist diagonal deposition device. In FIG. 2, a substrate 1 is a PET (polyethylene terephtalate) film. A reference numeral 2a is a supply roll of the PET film 1 and 2b is a winding roll of the PET film 1. Reference numerals 3, 4 and 5 denote a cooling can roll, a shielding plate and a crucible, respectively. A reference numeral 6 denotes 99.95 wt. % pure Fe. Reference numerals 7, 8, 9 and 10 denote an electron gun, a vacuum tank, an oxygen gas supply nozzle and an ion gun of Kaufman type. The vacuum tank 8 is vacuumed to a vacuum degree of $10^{-4}$ to $10^{-6}$ Torr. Then the Fe 6 is evaporated with the electron gun 7 so that metallic particles of Fe are adhered onto the PET film 1. Upon adhesion, a nitrogen ion is irradiated to the evaporated Fe metallic particle or the deposition surface through the ion gun 10. Oxygen gas is also irradiated through the nozzle 9. As a result, the Fe—N—O magnetic layer is obtained. Amounts for introducing the nitrogen ion and oxygen gas are set to satisfy the requirements (1), (2), (3) and (4) or (4a). Alternatively an activated Nitrogen can be irradiated in place of Nitrogen ion. In addition, oxygen ion can be used in place of oxygen gas.

The substrate 1 can be formed by either a magnetic or a non-magnetic material. However the non-magnetic substrate has been conventionally used. The substrate 1 is an organic material, for example, polyester such as PET, polyamide, polyimide, polysulfon, polycarbonate and an olefin resin such as polypropylene, cellulose resin, a vinyl chloride resin or the like. An undercoat layer is formed on a surface of the substrate 1 for improving the adhesion to the magnetic layer.

A protective film 13 is formed of an oxide, a nitride or a carbide, for example, carbon (glass-like carbon or diamond-like carbon), boron carbide, silicon nitride or the like. Particularly it is preferable to use the diamond-like carbon as the protective film.

Various types of lubricant can be used. Generally a fluorine lubricant is used, for example, —(C(R)F—CF$_2$—O)$_p$— ("R" represents a group such as F, CF$_3$, CH$_3$ or the like), carboxyl group modified perfluoro polyether such as HOOC—CF$_2$(O—C$_2$F$_4$)$_p$(OCF$_2$)$_q$—OCF$_2$—COOH, F—(CF$_2$CF$_2$CF$_2$O)$_n$—CF$_2$CF$_2$COOH; alcohol modified perfluoro polyether such as HOCH$_2$—CF$_2$(O—C$_2$F$_4$)$_p$(OCF$_2$)$_q$—OCF$_2$—CH$_2$OH, HO—(C$_2$H$_4$—O)$_m$—CH$_2$—(O—C$_2$F$_4$)$_p$(OCF$_2$)$_q$—OCH$_2$—(OCH$_2$CH$_2$)n—OH, F—(CF$_2$CF$_2$CH$_2$O)$_n$—CF$_2$CF$_2$OH or the like. Specifically the product called "FOMBLIN Z DIAC" or "FOMBLIN Z DOL" manufactured by Monte Katini Co. or the product called "Demnum SA" manufactured by DAIKIN INDUSTRIES, LTD. have been used.

The Fe—N—O magnetic layer 12 can be structured by a single layer or multiple layers. In case the Fe—N—O magnetic layer 12 has two or more layers, the composition of the upper layer of the Fe—N—O magnetic layer 12 should satisfy the requirements as mentioned above. In case the Fe—N—O magnetic layer 12 has two or more layers, a Co magnetic layer or a Co—Ni magnetic layer can be used in place of one Fe—N—O magnetic layer.

EXAMPLE

[Example-1]

An ion assist diagonal deposition device shown in FIG. 2 was used for producing the magnetic tape shown in FIG. 1.

A 6 μm thick PET film 1 was set between a supply roll 2a and a winding roll 2b. The PET film 1 was driven at 0.5 m/min. guided by a cooling can roll 3. The vacuum tank 8 was vacuumed to a vacuum degree of $8.8 \times 10^{-5}$ Torr. The crucible 5 was heated through an electron beam radiated from the electron gun 7 for melting and evaporating the Fe contained therein. As a result, a magnetic layer was formed on the PET film 1. Nitrogen ions were irradiated through the ion gun 10 to the magnetic layer. The amount of nitrogen gas supplied to the ion gun 10 was 51 sccm. Oxygen gas was also irradiated to the magnetic layer through the nozzle 9. The amount of supplied oxygen gas was 32 sccm. As a result, an Fe—N—O metallic magnetic layer 12 with the thickness of 1800 Å was formed on the PET film 1.

A diamond-like carbon film 13 with the thickness of 50 Å was coated on the Fe—N—O metallic magnetic layer 12 through an ECR plasma CVD method.

A fluorine lubricant such as perfluoro polyether(product name: FOMBLIN AM2001) was applied to the surface of the diamond-like carbon film 13 so that a 20 Å thick lubricant film 14 was coated thereon. An Al deposition film (back coat film) 15 with the thickness of 0.2 μm was coated to a back surface of the PET film 1.

The resultant magnetic tape was cut into 8 mm wide tapes and loaded in the respective cassettes.

[Example-2 to Example-6]

The same way as Example-1 was done and a magnetic tape was obtained except that each of the amount of nitrogen gas supplied to the ion gun 10 and the amount of oxygen gas supplied to the nozzle 9 was changed as shown in Table-1.

[Comparison-1 to Comparison-9]

The same way as Example-1 was done and a magnetic tape was obtained except that each of the amount of nitrogen gas supplied to the ion gun 10 and the amount of oxygen gas supplied to the nozzle 9 was changed as shown in Table-1.

[Comparison-10]

The same way as Example-1 was done and a magnetic tape was obtained except that Co—Ni(80–20) was used as a magnetic metal in the crucible 5 and the nitrogen ion was not irradiated.

[Characteristics]

Figure 3:
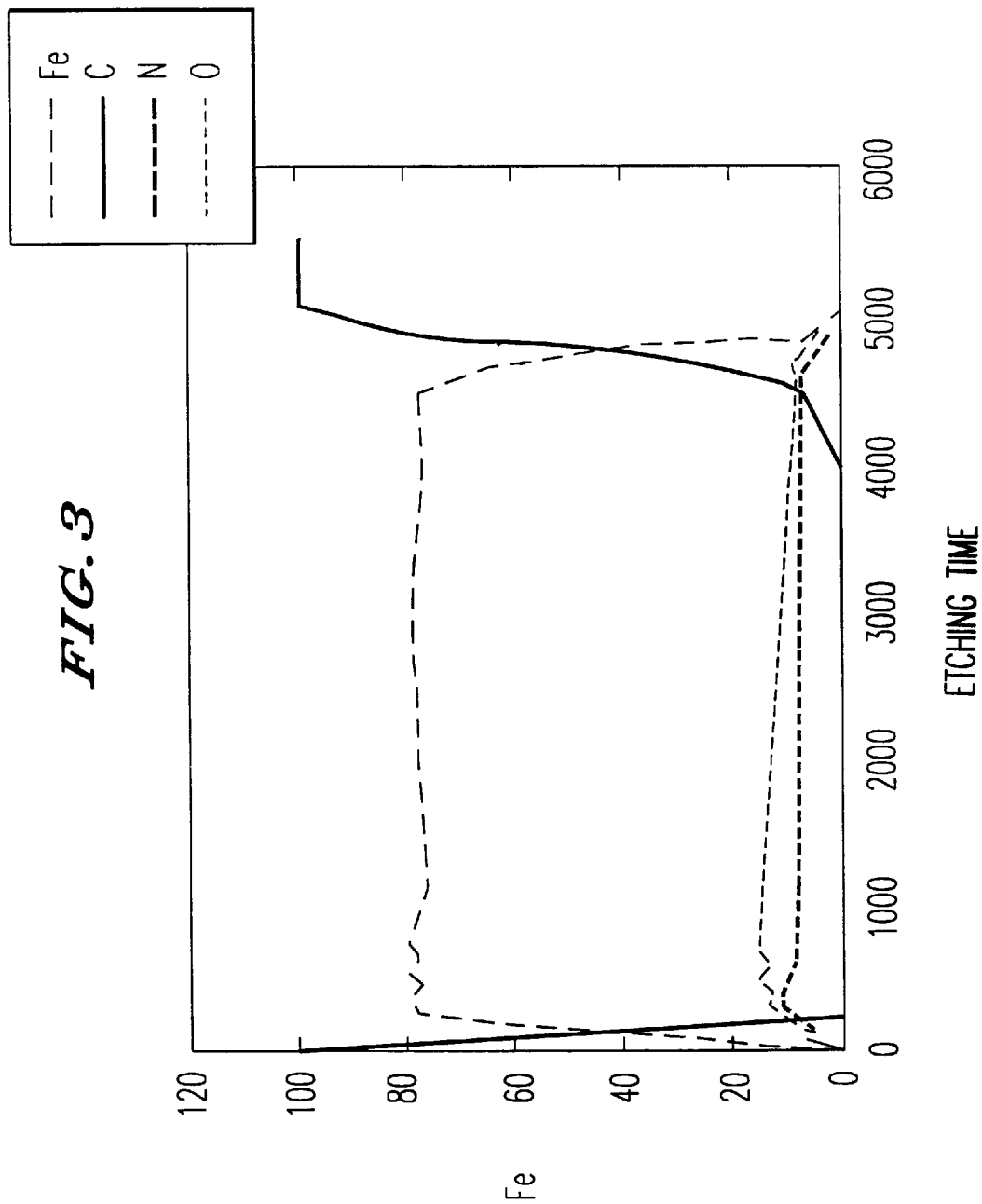
Figure 4:
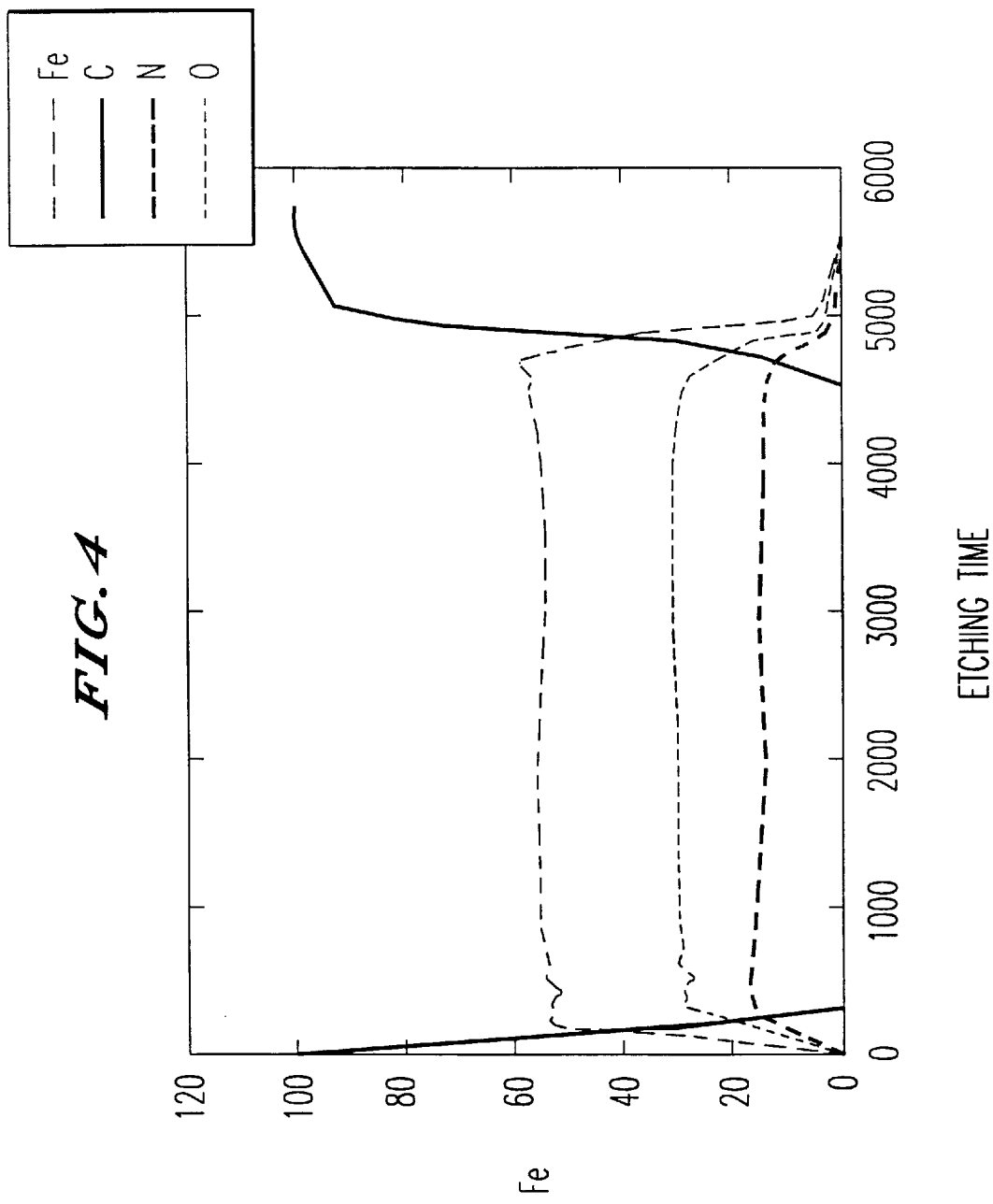

Each Fe content $F_1$, N content $N_1$, O content $O_1$ of the Fe—N—O metallic magnetic layer 12 of the 8 mm VTR magnetic tapes of the respective examples and comparisons was obtained through Auger electron spectroscopic analysis. The results are shown in Table-1. FIG. 3 shows an Auger profile of the magnetic tape of Example 1. FIG. 4 shows an Auger profile of the magnetic tape of Example 5. FIG. 5 shows an Auger profile of the magnetic tape of the comparison-2.

TABLE 1

| | Thickness of film | Amount of N$_2$ | Amount of O$_2$ | Fe—N—O (at. %) | | | |
|---|---|---|---|---|---|---|---|
| | Å | sccm | sccm | F$_1$ | N$_1$ | O$_1$ | O$_1$/N$_1$ |
| E-1 | 1800 | 51 | 32 | 78 | 9 | 13 | 1.44 |
| E-2 | 1830 | 80 | 46 | 67 | 14 | 19 | 1.36 |
| E-3 | 1790 | 105 | 56 | 59 | 18 | 23 | 1.27 |
| E-4 | 1820 | 120 | 68 | 51 | 21 | 28 | 1.33 |
| E-5 | 1850 | 80 | 73 | 55 | 15 | 30 | 2.14 |
| E-6 | 1760 | 69 | 88 | 52 | 12 | 36 | 3.00 |
| C-1 | 1810 | 180 | 7 | 63 | 34 | 3 | 0.09 |
| C-2 | 1780 | 200 | 17 | 58 | 35 | 7 | 0.20 |
| C-3 | 1820 | 0 | 110 | 55 | 0 | 45 | — |
| C-4 | 1850 | 131 | 83 | 43 | 23 | 34 | 1.48 |
| C-5 | 1750 | 105 | 58 | 70 | 20 | 10 | 0.50 |

TABLE 1-continued

| | Thickness of film | Amount of N$_2$ | Amount of O$_2$ | Fe—N—O (at. %) | | | |
|---|---|---|---|---|---|---|---|
| | Å | sccm | sccm | F$_1$ | N$_1$ | O$_1$ | O$_1$/N$_1$ |
| C-6 | 2100 | 63 | 11 | 85 | 10 | 5 | 0.50 |
| C-7 | 1620 | 160 | 50 | 50 | 30 | 20 | 0.67 |
| C-8 | 1830 | 50 | 100 | 52 | 8 | 40 | 5.00 |
| C-9 | 1820 | 30 | 38 | 89 | 5 | 15 | 3.00 |
| C-10 | 1780 | — | 45 | Co—Ni (80-20) | | | — |

Measurement results with respect to magnetic characteristics and electromagnetic conversion characteristics of examples and comparisons are shown in Table-2.

TABLE 2

| | Hc(Oe) | Bs(G) | Regeneration output(dB) | | | | C/N (dB) |
|---|---|---|---|---|---|---|---|
| | | | 1 MHz | 5 MHz | 10 MHz | 15 MHz | |
| E-1 | 1210 | 7600 | 4.1 | 2.7 | 2.4 | 2.3 | 3.6 |
| E-2 | 1430 | 6450 | 3.5 | 2.4 | 2.5 | 2.9 | 3.5 |
| E-3 | 1570 | 5950 | 3.1 | 2.4 | 2.8 | 3.7 | 3.4 |
| E-4 | 1690 | 5350 | 2.2 | 2.4 | 3.1 | 5.1 | 3.5 |
| E-5 | 1750 | 5300 | 2.1 | 2.3 | 3.2 | 6.3 | 3.7 |
| E-6 | 2310 | 4800 | Suitable for magnetic transfer mother tape because of high Hc | | | | |
| C-1 | 870 | 6630 | 2.7 | 1.3 | −0.7 | −2.1 | −2.3 |
| C-2 | 1030 | 4930 | 1.3 | 1.7 | 1.1 | 0.5 | −1.7 |
| C-3 | 1520 | 4520 | −0.7 | 0.6 | 1.4 | 2.1 | 1.2 |
| C-4 | 1480 | 4300 | −2.1 | −1.8 | 0.3 | 0.7 | 3.6 |
| C-5 | 1580 | 6090 | 2.0 | 2.0 | 2.5 | 2.5 | −1.2 |
| C-6 | 1410 | 6650 | 2.5 | 2.6 | 2.7 | 2.7 | −2.1 |
| C-7 | 1290 | 4300 | −0.5 | −0.5 | 0 | 0.5 | −1.9 |
| C-8 | 2700 | 3100 | −3.3 | −3.1 | −2.9 | −1.7 | 0.3 |
| C-9 | 1860 | 4200 | −1.6 | −0.7 | 0.8 | 1.6 | 2.8 |
| C-10 | 1050 | 5000 | 0 | 0 | 0 | 0 | 0 |

*C/N represents a ratio of output at 10 MHz to noise level at 9MHz.

The above results show that the Fe—N—O metallic magnetic layer as defined by the present invention exhibits an excellent electromagnetic conversion characteristic.

Satisfying only the requirement of the composition of Fe, N and O is not sufficient to provide a high regeneration output. While satisfying only the requirement of the coercive force is not sufficient to provide a high regeneration output neither. Only when both requirements of the composition Fe, N and O and the coercive force are satisfied, the excellent electromagnetic conversion characteristic can be obtained.

What is claimed is:

1. A magnetic recording medium comprising a substrate and a magnetic layer, wherein
   said magnetic layer is coated on said substrate,
   said magnetic layer is an Fe—N—O magnetic layer,
   each of Fe content F$_1$, N content N$_1$ and O content O$_1$ contained in said Fe—N—O magnetic layer satisfies respective requirements (1), (2), (3) and (4), and
   said magnetic layer exhibits a coercive force Hc in a horizontal direction ranging from 1200 to 2400 Oe.

$$F_1 = 50\text{--}80 \text{ at. \%} \qquad (1)$$

$$N_1 = 9\text{--}25 \text{ at. \%} \qquad (2)$$

$$O_1 = 11\text{--}36 \text{ at. \%} \qquad (3)$$

$$N_1 < O_1 \qquad (4).$$

2. The magnetic recording medium of claim 1, wherein each of said F$_1$, N$_1$ and O$_1$ satisfies respective requirements (1), (2), (3) and (4a).

$$F_1 = 50\text{--}80 \text{ at. \%} \qquad (1)$$

$$N_1 = 9\text{--}25 \text{ at. \%} \qquad (2)$$

$$O_1 = 11\text{--}36 \text{ at. \%} \qquad (3)$$

$$1.25 \times N_1 \leq O_1 \qquad (4a).$$

3. The magnetic recording medium of claim 1, wherein said Fe—N—O magnetic layer satisfies a requirement of N content<O content over a whole area in a vertical direction to said magnetic layer.

4. The magnetic recording medium of claim 1, wherein said Fe—N—O magnetic layer exhibits a coercive force Hc in a horizontal direction ranging from 1500 to 2000 Oe.

5. The magnetic recording medium of claim 1, wherein said magnetic layer is provided with a protective film coated thereon.

6. The magnetic recording medium of claim 5, wherein said protective film is a carbon film.

7. The magnetic recording medium of claim 5, wherein said protective film is a diamond-like carbon film.

8. The magnetic recording medium of claim 1, wherein said magnetic layer is provided with a lubricant film coated thereon.

9. The magnetic recording medium of claim 8, wherein said lubricant is a fluorine lubricant.

10. The magnetic recording medium of claim 1, wherein said protective film is coated on said magnetic layer and said lubricant film is coated on said protective film.

11. The magnetic recording medium of claim 10, wherein said protective film is a carbon film.

12. The magnetic recording medium of claim 10, wherein said protective film is a diamond-like carbon film.

13. The magnetic recording medium of claim 10, wherein said lubricant is a fluorine lubricant.

14. The magnetic recording medium of claim 1, said magnetic recording medium is a magnetic tape.

15. A magnetic recording medium comprising a substrate, a magnetic layer, a protective film and a lubricant film, wherein
   said magnetic layer is coated on said substrate,
   said protective film is coated on said magnetic layer,
   said lubricant film is coated on said protective film,
   said magnetic layer is an Fe—N—O magnetic layer,
   each of Fe content F$_1$, N content N$_1$ and O content O$_1$ contained in said Fe—N—O magnetic layer satisfies respective requirements (1), (2), (3) and (4a),
   said magnetic layer has a coercive force Hc in a horizontal direction ranging from 1200 to 2400 Oe,
   said protective film is a carbon film, and
   said lubricant is a fluorine lubricant $$F_1 = 50\text{--}80 \text{ at. \%} \qquad (1)$$

$$N_1 = 9\text{--}25 \text{ at. \%} \qquad (2)$$

$$O_1 = 11\text{--}36 \text{ at. \%} \qquad (3)$$

$$1.25 \times N_1 \leq O_1 \qquad (4a).$$

16. The magnetic recording medium of claim 15, wherein said Fe—N—O magnetic layer satisfies a requirement of N content<O content over a whole area to said magnetic layer in a vertical direction.

17. The magnetic recording medium of claim 15, wherein said Fe—N—O magnetic layer exhibits a coercive force Hc in a horizontal direction ranging from 1500 to 2000 Oe.

* * * * *